United States Patent [19]

Snyder et al.

[11] Patent Number: 5,544,927
[45] Date of Patent: Aug. 13, 1996

[54] TWIST-IN VISOR MOUNT

[75] Inventors: Ronald P. Snyder; Jesse Kalkman, both of Holland, Mich.

[73] Assignee: Prince Corporation, Holland, Mich.

[21] Appl. No.: 288,469

[22] Filed: Aug. 10, 1994

[51] Int. Cl.[6] ..................................... B60J 3/00
[52] U.S. Cl. ..................... 296/97.9; 248/613; 296/97.13
[58] Field of Search ........................... 296/97.9, 97.12, 296/97.13, 97.1; 248/289.1, 222.3, 613

[56] References Cited

U.S. PATENT DOCUMENTS

| | | | |
|---|---|---|---|
| 3,017,217 | 1/1962 | Keating | 296/97 |
| 4,529,157 | 7/1985 | Suman et al. | 248/289.1 |
| 4,729,590 | 3/1988 | Adams | 296/97 K |
| 4,989,911 | 2/1991 | Van Order | 296/97.9 |
| 5,031,954 | 7/1991 | Peterson et al. | 296/97.9 |
| 5,062,608 | 11/1991 | Phelps et al. | 248/289.1 |
| 5,201,564 | 4/1993 | Price | 296/97.9 |
| 5,242,204 | 9/1993 | Kitterman et al. | 296/97.9 |
| 5,314,227 | 5/1994 | Weiland et al. | 248/289.1 X |

FOREIGN PATENT DOCUMENTS

| | | | |
|---|---|---|---|
| 633398 | 12/1949 | United Kingdom | 296/97.13 |
| 1251479 | 10/1971 | United Kingdom. | |

*Primary Examiner*—David M. Mitchell
*Assistant Examiner*—Kia M. Robinson
*Attorney, Agent, or Firm*—Price, Heneveld, Cooper, DeWitt & Litton

[57] ABSTRACT

A visor mounting system includes a visor pivot rod with an end which extends through a bezel and a non-circular locking plate which cooperates with the bezel and pivot rod for allowing the visor to be initially inserted in an aperture in the underlying roof support and subsequently rotated using the visor as the installation tool to a position in which the locking plate lockably engages an aperture in the vehicle roof completing the installation. In a preferred embodiment of the invention, the locking plate includes arcuate collars which slidably interfit with arcuate collars of the bezel to interlock the plate and bezel from relative rotation and yet allow the locking plate and bezel to move with respect to one another.

21 Claims, 2 Drawing Sheets

U.S. Patent  Aug. 13, 1996  Sheet 1 of 2  5,544,927
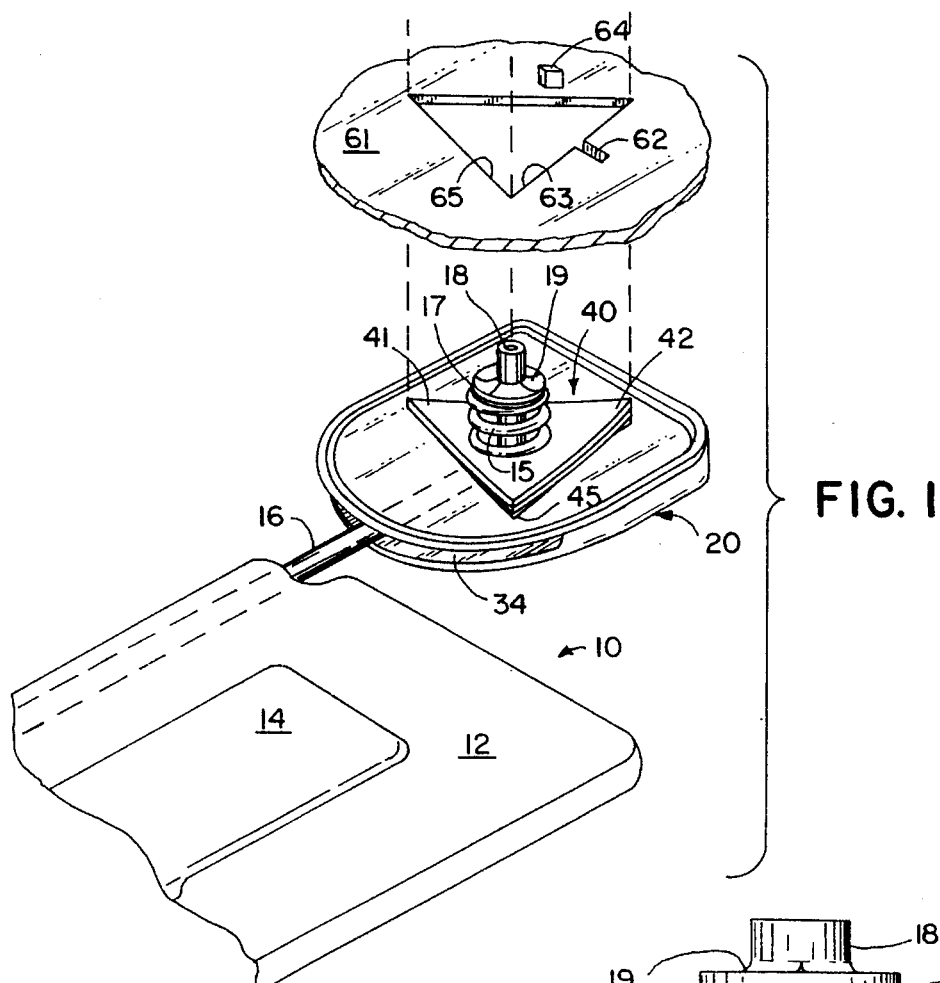
FIG. 1
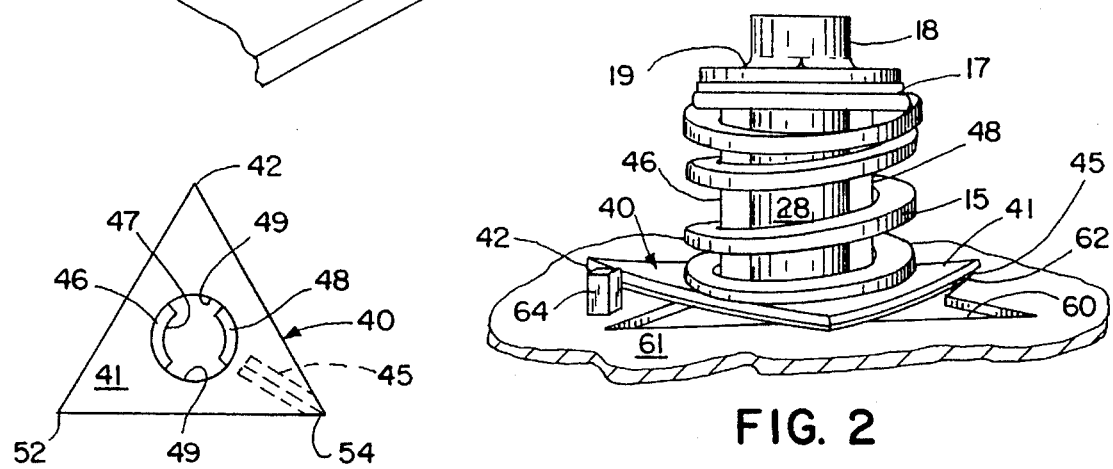
FIG. 3
FIG. 2

TWIST-IN VISOR MOUNT

BACKGROUND OF THE INVENTION

The present invention pertains to automotive visors and particularly a mounting system for attaching visors to the roof of a vehicle.

Visors are typically mounted to a pivot rod for allowing movement of the visor both from a raised stored position against the headliner of a vehicle to a lowered use position for blocking sunlight entering the windshield. Such visor mounts also allow movement of the visor to the side window position for selectively blocking sunlight entering from a side window as well. To provide such visor control an elbow pivot rod is frequently employed and has an end mounted to the underlying roof support structure. Such mounting interface has been the subject of a variety of mounting arrangements including keyed apertures formed in the roof of a vehicle for receiving a rotatable mounting member which subsequently locks to the roof of a vehicle. U.S. Pat. Nos. 4,529,157; 4,729,590; and 5,242,204 disclose bayonet-type visor mounts which either require a single screw for compressively gripping the sheet metal roof ('157) or a special mounting ('590). The '204 patent discloses a system by which the visor blade itself is used as the installation tool which allows the insertion and subsequent rotation of the visor and mounting bracket keyed thereto to lock into place in the vehicle roof and subsequently allow the visor to move to the typical adjusted positions for use.

Although these visor mounts provide ease of installation as compared to the screw-in type visor mounts of the past, such twist-in visor mounts of the prior art typically have required somewhat complicated mounting structures requiring expensive tooling to manufacture. As a result, there remains a need for an easily installed twist-in type visor mount which can be inexpensively manufactured and yet provide a secure mount for the visor which is durable and provides the desired "feel" for the visor movement.

SUMMARY OF THE PRESENT INVENTION

The visor mounting system of the present invention accommodates these goals by providing a visor pivot rod with a bezel and locking plate which cooperates with the bezel and pivot rod for allowing the visor to be initially inserted into an aperture in the underlying roof support and subsequently be rotated by use of the visor as the installation tool to a position in which the locking plate lockably engages an aperture in the vehicle roof completing the installation. In a preferred embodiment of the invention, the locking plate includes arcuate collars which slidably interfit with arcuate collars of the bezel to interlock the plate and bezel from relative rotation and yet allow the locking plate and bezel to move with respect to one another. An end of the pivot rod extends through the bezel and locking plate and a bias spring urges the locking plate toward the bezel in predetermined spaced relationship allowing the gripping of the sheet metal roof support between the facing surfaces of the locking plate and bezel. In a preferred embodiment of the invention also the locking plate includes a locking extension which when the plate is aligned in a predetermined relationship to the sheet metal roof, engages a locking slot in the roof for rotatably fixing the locking plate with respect to the roof and thereby also rotatably fixing the bezel with respect to the vehicle.

In a preferred embodiment of the invention also, the bezel includes a collar on the side opposite the arcuate collar for engaging the orthogonally extending pivot rod such that the pivot rod will rotate the bezel and interlock locking plate for installation of the visor when rotated in an installing direction. According to yet a further aspect of the invention, the bezel includes an aperture aligned with the locking extension of the locking plate for allowing the insertion of a tool for disengaging the locking extension from the locking slot for removal of the visor as necessary for replacement or servicing. In one preferred embodiment of the invention, the locking plate and corresponding aperture in the vehicle roof were non-circular and preferably triangular in shape.

By providing a locking plate and bezel which are rotatably locked with respect to one another but allowed to move toward and away from one another, an improved twist-in visor mounting system is provided which is durable, easy to install and yet relatively inexpensive to manufacture. These and other features, objects and advantages of the present invention will become apparent to those skilled in the art upon reading the following description thereof together with reference to the accompanying drawings in which:

BRIEF DESCRIPTION OF THE DRAWINGS

FIG. 1 is a fragmentary exploded perspective view of a visor embodying the mounting system of the present invention and a section of the vehicle roof for receiving the visor mount of the present invention;

FIG. 2 is an enlarged fragmentary perspective view of the visor shown in an installed position as viewed from above the sheet metal roof;

FIG. 3 is a top plan view of the locking plate of the visor mounting system as seen also in FIGS. 1 and 2;

DETAILED DESCRIPTION OF THE PREFERRED EMBODIMENT

Figure 4:
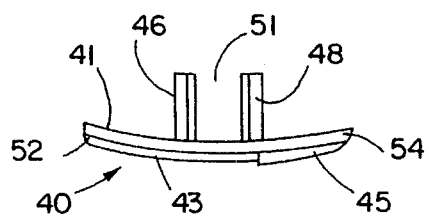
FIG. 4 is a from elevational view of the locking plate shown in FIG. 3.

Referring initially to FIG. 1 there is shown a visor 10 for a vehicle such as an automobile. The visor includes a visor body or blade 12 which may include an illuminated vanity mirror assembly 14 mounted within the visor body and supplied with electrical operating power by a conductor which extends through the hollow conductive metallic L-shaped visor pivot rod 16 which, through the mounting to the vehicle roof structure, provides the remaining circuit conductor. The end of pivot rod 16 which extends within the visor body 12 may be mounted for rotation with respect to the visor body by a suitable torque fitting such as disclosed in U.S. Pat. No. 5,004,289. The stub end 18 of the L-shaped visor rod extends through a trim bezel 20 and a locking plate 40 and is mounted for a predetermined torque rotation with respect to the locking plate and bezel by a conventional compression spring 15 (FIG. 2) which extends over the end 18 of pivot rod 16 and has one end which engages the upper surface 41 of locking plate 40 and an opposite end which engages a washer 17 and locking nut 19 for compressibly urging the locking plate 40 toward the bezel 20 providing the desired rotational torque for end 18 of the pivot rod with respect to the fixed locking plate and bezel once installed as described in greater detail below.

In the preferred embodiment of the invention the locking plate 40 is triangular although any non-circular (i.e. rotationally asymmetrical) shape can be employed. The locking plate 40 is made of a suitable spring steel material having a thickness of approximately 2.5 mm in the preferred embodiment. The triangular locking plate is an equilateral triangle with each side being approximately 27.42 mm in the preferred embodiment. Plate 40 is received through the vehicle roof by a similarly shaped equilateral triangular aperture 60 (FIG. 1) formed in the vehicle sheet metal supporting roof structure and having sides which are approximately 27.92 mm in length to easily accommodate the somewhat smaller triangular locking plate when the apices of the respective triangles are aligned for installation of the visor. The mounting aperture 60 has a locking slot 62 formed outwardly from one leg 63 of the aperture 60 for receiving a locking extension 45 on plate 40 when the visor is in an installed position to subsequently prevent rotation of the locking plate 40 with respect to the sheet metal roof of the vehicle. Additionally, formed on the upper surface 61 of the sheet metal roof is a stop 64 which as shown in FIG. 2 engages apex 42 (FIGS. 2 and 3) of the triangular locking plate 40 when in an installed position as shown in FIG. 2. In this position, triangular and tapered locking ridge or extension 45 formed in the lower surface 43 of locking plate 40 extends within locking slot 62 of the sheet metal roof aperture 60 as seen in FIG. 2 for anchoring the locking plate against rotation with respect to the roof. The locking extension 45 has a triangular tapered (i.e. arrowhead-shaped) structure as best seen in FIGS. 3 and 4.

Turning now to FIGS. 3 and 4, the locking plate is shown in greater detail and includes a pair of upwardly extending arcuate collars 46 and 48 having an outer diameter somewhat smaller than the inner diameter of bias spring 15 such that spring 15 can extend over the collars 46 and 48 as seen in FIG. 2. The collars are integrally formed with the locking plate and define a segmented arcuate aperture 47 having a diameter for receiving the outer diameter of pivot rod end 18. Plate 40 includes segmented arcuate aperture 49 which has a diameter greater than the arcuate surface 47 of collars 46 and 48 to define a keyway, as best seen in FIG. 3, for slidably receiving interlocking collars 26 and 28 of bezel 20 which extend upwardly through the apertures 49 formed in locking plate 40 for rotatably interlocking the plate and bezel together while permitting their separation for compressibly engaging the sheet metal roof during installation of the visor. Each of the apices 42, 52 and 54 of the triangular locking plate 40 are either upwardly canted as shown in FIG. 4 or can otherwise be beveled at an angle of approximately 30° to facilitate installation of the visor as described below.

Figure 6:
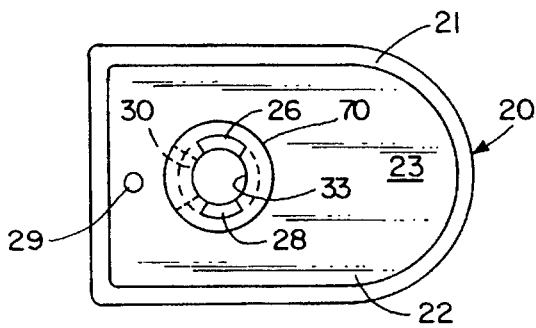
FIG. 6 is a top plan view of the bezel shown in FIG. 5.
Figure 5:
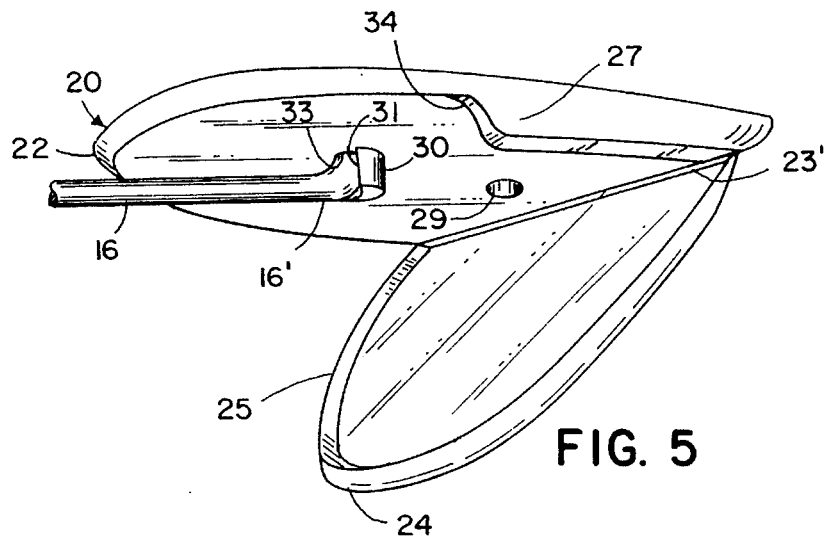
FIG. 5 is a fragmentary perspective view of the bezel shown in a partially installed position with the visor rod extending therethrough.
Figure 7:
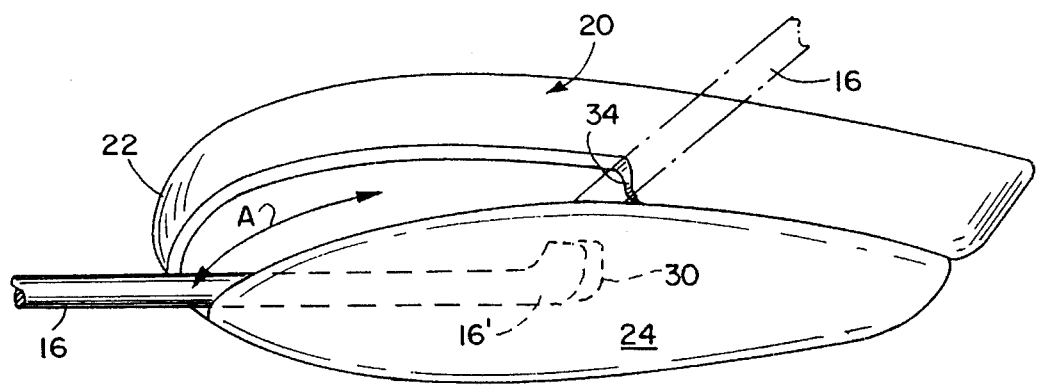
FIG. 7 is a fragmentary perspective view, partly in phantom form, of the bezel and visor rod shown in FIG. 5 shown in an installed position.

Turning now to FIGS. 5 and 6 the bezel and pivot rod relationship is shown in which the bezel 20 includes a body 22 having an aperture 33 for receiving the stub end 18 of the pivot rod 16. Bezel body 22 is made of a polymeric material having a cover 24 which is integrally formed along an integral hinge 23' allowing cover 24 to be moved from an open position as shown in FIG. 5 for installation of the visor and subsequently to a closed trim appearance in the final installed position as shown in FIG. 7. On its upper surface (i.e. the surface facing locking member 40) the bezel includes a pair of upwardly extending arcuate collars 26 and 28 as best seen in FIG. 6 which extend through aperture sections 49 of the locking plate and fill the gap 51 (FIG. 4) between collars 46 and 48 of the locking plate 40. Thus, the upper surface 23 of bezel 20 prior to installation is immediately adjacent and in closely spaced relationship to the lower surface 43 of the locking plate and held in such closely spaced relationship by the compressed bias spring 15. To accommodate different thickness roof support members the area surrounding collars 26 and 28 include a spacer ring or washer 70 which can be integrally formed with the bezel or can be a separate washer of desired thickness.

The bottom of the bezel body 22 includes, as best seen in FIG. 5, a pivot rod engaging collar 30 which engages the corner section 16' of the L-shaped pivot rod during installation such that section 16' of the pivot rod 16 will contact edge 31 of collar 30 during installation of the visor for rotating the bezel and rotatably interlock locking plate 40 together once locking plate 40 has been inserted into aperture 60 of the sheet metal roof. The bezel further includes a aperture 29 located to be positioned in alignment with corner 54 of triangular locking plate 40 such that the locking extension or ridge 45 can be disengaged from slot 62 by inserting a cylindrical tool through aperture 29 and pushing upwardly for removal of the visor for servicing or replacement if necessary.

The bezel body 22 includes an arcuate slot 34 providing clearance for the rotation of pivot rod 16 which extends through the bezel and rotates through an arc of approximately 110° as shown by arrow A in FIG. 7 to allow the visor to pivot from the front windshield position to the side window position upon installation. The arcuate slot 34 provides sufficient clearance between the inner edge 25 of cover 24 and the edge of pivot rod 16 to allow clearance of the pivot rod through the slot 34 between the main body 22 of bezel 20 and cover 24 which may include a snap-fitting ridge which interlocks with the lip 27 of bezel 20 for holding the cover in place as seen in FIG. 7. The bezel 20 is made of any suitable polymeric material such as polypropylene, ABS, PVC or polycarbonate and may include a reinforcing ridge 21 on its upper surface 23 for providing strength while allowing a minimal amount of material to be used.

The visor is preassembled with the mount by extending the end 18 of the visor pivot rod through aperture 33 in the bezel in a direction as seen in FIG. 5 and subsequently inserting the locking plate 40 over the pivot rod end 18 with locking ridge 45 facing surface 23 of the bezel and aligned with aperture 29 which also allows the interfitting of arcuate collars 46 and 48 on the locking member 40 with collars 26 and 28 of the bezel. Subsequently, the bias spring 15 is extended over the cylinder formed by the inter-engaging collars 26, 28, 46 and 48 and the extending tip 18 of the pivot rod end covered with washer 17 and locking nut 19 for compressibly holding the assembly together. In this position, the apices 42, 52 and 54 of the triangular locking plate are spaced from the surface 23 of bezel 20 a distance sufficient to provide a slight clearance with the sheet metal roof mounting aperture such that the inclined apices of the triangular locking plate will slightly clear the triangular edges of aperture 60. The vertical height of the spacing between the surface 23 of bezel 20 and surface 43 of locking plate 40 is controlled for a given vehicle by annular shoulder 70 which contacts the lower surface 43 of plate 40 adjacent aperture 47. This provides the desired spacing for the roof and also the headliner and any other material extending between the decorative facing surface of the headliner and the top surface 61 of the sheet metal mounting member. Thus, for different vehicles different thickness spacing washers 70 can be employed and bezel 20 may integrally include such a spacer, it being understood that the collars 26 and 28 will always extend sufficiently above the spacers to extend coextensively with arcuate collars 46 and 48 of locking member 40 when the visor mount is assembled. Cover 24 is then snap-fitted over visor rod section 16' to complete the preassembly of the visor.

The visor is then installed in a vehicle by inserting the visor generally when aligned with a side window in the relative position illustrated in FIG. 1 for the driver's side visor in which the tip 54 of mounting plate 40 is aligned with apex 65 of the mounting plate such that rotation of the visor in a clockwise direction (i.e. toward the windshield) will move apices 54 of the locking plate together with its associated locking extension 45 into alignment with locking slot 62 whereupon the locking extension 45 will snap-fit into slot 62 at the same time as apex 42 engages stop 64 of the sheet metal roof as illustrated in FIG. 2. In some installations, the stop 64 may be unnecessary inasmuch as the locking extension 45 will provide a tactile snap-in feel with respect to slot 62. Nonetheless, stop 64 can easily be integrally formed with the mounting roof structure and prevent over-rotation during quick installation of the visor.

Once in an installed position, the visor pivot rod end 18 extending through bezel 20 and locking plate 40 provides, in connection with the bias spring 15, a predetermined rotational torque for the movement of the visor from a front windshield position to a side window position by allowing the visor rod end 18 to rotate with respect to bezel 20 which is lockably held in place by plate 40 with respect to the vehicle.

Thus, by the use of the locking plate 40 and cooperating bezel member 20, a twist-in visor mount is provided which is relatively easily manufactured and installed at the vehicle assembly plant and provides the durability and feel of the time-honored screw-in type visor mounts which employ bias springs for controlling the relative torque between the visor rod and its associated mounting structure. The assembly provides such visor mount and control using a minimum number of parts which cooperate with one another to provide the installation and subsequent control of the visor. It will become apparent to those skilled in the art that various modifications to the Preferred embodiment of the invention can be made without departing from the spirit or scope thereof as defined by the appended claims.

The embodiments of the invention in which an exclusive property or privilege is claimed are defined as follows:

1. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel;

a locking member having at least three generally equally spaced projections extending outwardly from a central aperture for receiving said pivot rod, said locking member further including an interlocking member engaging said interlocking member of said bezel to prevent relative rotation of said bezel and locking member when both are extended over said end of said pivot rod while permitting said locking member to move toward and away from said bezel, said projections including portions which extend away from said bezel when said bezel and said locking member are coupled together; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle.

2. The visor mounting system as defined in claim 1 wherein said locking member includes a locking extension shaped to be received in a slot formed in the vehicle roof support for preventing rotation of the locking member when in an installed position.

3. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel;

a non-circular locking member having an aperture for receiving said pivot rod and an interlocking member engaging said interlocking member of said bezel to prevent relative rotation of said bezel and locking member when both are extended over said end of said pivot rod while permitting said locking member to move toward and away from said bezel, wherein said locking member includes a locking extension shaped to be received in a slot formed in the vehicle roof support for preventing rotation of the locking member when in an installed position; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle, wherein said bezel interlocking member comprises a pair of spaced arcuate collars extending upwardly from an upper surface of said bezel and said locking member includes a pair of spaced arcuate collars extending upwardly from said locking member and angularly positioned to surround said end of said visor pivot rod and interengage said arcuate collars of said bezel.

4. The visor mounting system as defined in claim 3 wherein said bezel includes an aperture aligned with said locking extension of said locking member for allowing deflection of said locking member to release said locking extension for removal of said visor.

5. The visor mounting structure as defined in claim 1 wherein said bezel includes a collar engaging said pivot rod such that said visor body can rotate said bezel and locking member together for installation of the visor.

6. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel, wherein said bezel includes a collar engaging said pivot rod such that said visor body can rotate said bezel and a locking member together for installation of the visor;

a non-circular locking member having an aperture for receiving said pivot rod and an interlocking member engaging said interlocking member of said bezel to prevent relative rotation of said bezel and locking member when both are extended over said end of said pivot rod while permitting said locking member to move toward and away from said bezel, wherein said bezel interlocking member comprises at least one arcuate collar extending upwardly from an upper surface of said bezel and said locking member includes at least one arcuate collar extending upwardly from said locking member and angularly positioned to surround said end of said visor pivot rod and interengage said arcuate collar of said bezel; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle.

7. The visor mounting system as defined in claim 5 wherein said locking member includes a locking extension shaped to be received in a slot formed in the vehicle roof support for preventing rotation of the locking member when in an installed position.

8. The visor mounting system as defined in claim 7 wherein said bezel includes an aperture aligned with said locking extension of said locking member for allowing deflection of said locking member to release said locking extension for removal of said visor.

9. The visor mounting structure as defined in claim 1 wherein said bezel includes a body integrally molded of a polymeric material and having a collar for engaging said pivot rod such that said visor body can rotate said bezel and locking member together for installation of the visor.

10. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel;

a non-circular locking member having an aperture for receiving said pivot rod and an interlocking member engaging said interlocking member of said bezel to prevent relative rotation of said bezel and locking member when both are extended over said end of said pivot rod while permitting said locking member to move toward and away from said bezel, wherein said bezel includes a body integrally molded of a polymeric material and having a collar for engaging said pivot rod such that said visor body can rotate said bezel and locking member together for installation of the visor, and wherein said bezel includes a cover hingedly joined to said bezel body and a slot for allowing said pivot rod to rotate between said cover and said bezel body; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle.

11. The visor mounting system as defined in claim 10 wherein said cover and body are integrally molded of polycarbonate.

12. The visor mounting system as defined in claim 1 wherein said locking member is generally triangular.

13. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel;

a non-circular, generally triangular locking member having an aperture for receiving said pivot rod and an interlocking member engaging said interlocking member of said bezel to prevent relative rotation of said bezel and locking member when both are extended over said end of said pivot rod while permitting said locking member to move toward and away from said bezel, wherein the corners of said generally triangular locking member are inclined away from said bezel; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle.

14. A twist-in visor mounting system comprising:

a visor body having a visor pivot rod with an end extending therefrom;

a bezel including an aperture for receiving said end of said visor rod;

a locking member having a central aperture for receiving said pivot rod and at least three generally equally spaced projections extending radially outwardly from said central aperture, said projections have surface portions facing said bezel when assembled which surface portions are inclined away from said bezel, said projections engaging edges of a mounting aperture in a roof support member when installed;

means to prevent relative rotation of said bezel and locking member when both are extended over said end of said pivot rod while permitting said locking member to move toward and away from said bezel; and a spring for providing a compressive force between said locking member and said bezel such that facing surfaces of said locking member and said bezel will compressibly engage the roof support member when said locking member is inserted in said mounting aperture of the roof support member and rotated such that a locking extension engages a slot in the roof support member for holding the visor to a vehicle.

15. The visor mounting system as defined in claim 14 wherein said locking member is a generally triangular plate.

16. The visor mounting system as defined in claim 15 wherein means to prevent relative rotation comprises an interlocking member on said bezel and an interlocking member on said plate which slidably engages said interlocking member on said bezel.

17. A twist-in visor mounting system comprising:

a visor body having a visor pivot rod with an end extending therefrom;

a bezel including a bezel body integrally molded of a polymeric material and an aperture for receiving said end of said visor rod, wherein said bezel includes a cover hingedly joined to said bezel body and defining a slot for allowing said pivot rod to rotate between said cover and said bezel body;

a non-circular locking member comprising a generally triangular plate having an aperture for receiving said pivot rod and a locking extension for engaging a slot in a roof support member;

means to prevent relative rotation of said bezel and locking member when both are extended over said end of said pivot rod while permitting said locking member to move toward and away from said bezel wherein said means to prevent relative rotation comprises an interlocking member on said bezel and an interlocking member on said plate which slidably engages said interlocking member on said bezel, and wherein said bezel includes an aperture aligned with said locking extension of said locking member for allowing deflection of said locking member to release said locking extension for removal of said visor; and a spring for providing a compressive force between said locking member and said bezel such that facing surfaces of said locking member and said bezel will compressibly engage the roof support member when said locking member is inserted in an aperture of a roof support member and rotated such that said locking extension engages the slot in the roof support member for holding the visor to a vehicle.

18. A twist-in visor mounting system comprising:

a visor body having a visor pivot rod extending therefrom including a cylindrical end extending generally orthogonal to the longitudinal axis of said visor body;

a bezel including an aperture for receiving said visor rod end and an interlocking member extending from said bezel;

a non-circular locking member having an aperture for receiving said pivot rod and an interlocking member engaging said interlocking member of said bezel to prevent relative rotation of said bezel and locking member when both are extended over said end of said pivot rod while permitting said locking member to move toward and away from said bezel, wherein the corners of said locking member are inclined away from said bezel; and a spring for providing a compressive force between said locking member and said bezel such that said locking member, when inserted in an aperture of a vehicle roof support, will compressibly engage the vehicle roof support between facing surfaces of said locking member and said bezel for holding the visor to a vehicle.

19. A visor mounting system comprising:

a visor body having a visor pivot rod with an end extending therefrom;

a bezel including an aperture for receiving said visor rod end and an interlocking member extending from said bezel wherein said bezel includes a cover hingedly joined to said bezel body and a slot for allowing said pivot rod to rotate between said cover and said bezel body;

a non-circular locking plate having an aperture for receiving said pivot rod and an interlocking member engaging said interlocking member of said bezel to prevent relative rotation of said bezel and locking plate when both are extended over said end of said pivot rod while permitting said locking plate to move toward and away from said bezel, said locking plate having a locking extension which faces a roof support member for engaging a slot in the roof support member, said locking plate further including an edge inclined away from said bezel; and a spring coupled to said locking plate for urging said locking plate toward said bezel.

20. The visor mounting system as defined in claim 19 wherein said cover and body are integrally molded of polycarbonate.

21. The visor mounting system as defined in claim 20 wherein said locking plate is generally triangular.

* * * * *